US006258896B1

(12) United States Patent
Abuelyaman et al.

(10) Patent No.: US 6,258,896 B1
(45) Date of Patent: Jul. 10, 2001

(54) DENDRITIC POLYMER DISPERSANTS FOR HYDROPHOBIC PARTICLES IN WATER-BASED SYSTEMS

(75) Inventors: Ahmed Salih Abuelyaman, Woodbury; Prabhakara Satyauolu Rao, Maplewood; Babu N. Gaddam, Woodbury, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/216,165

(22) Filed: Dec. 18, 1998

(51) Int. Cl.[7] .................................................. C08F 20/00
(52) U.S. Cl. .................. 525/437; 525/438; 525/440; 525/442; 525/444
(58) Field of Search ................................... 525/437, 444, 525/438, 440, 442

(56) References Cited

U.S. PATENT DOCUMENTS

| | | | |
|---|---|---|---|
| 4,507,466 | 3/1985 | Tomalia et al. | 528/332 |
| 4,558,120 | 12/1985 | Tomalia et al. | 528/363 |
| 4,568,737 | 2/1986 | Tomalia et al. | 528/332 |
| 4,587,329 | 5/1986 | Tomalia et al. | 528/363 |
| 4,597,794 | 7/1986 | Ohta et al. | 106/20 |
| 4,631,337 | 12/1986 | Tomalia et al. | 528/391 |
| 4,694,064 | 9/1987 | Tomalia et al. | 528/332 |
| 4,713,975 | 12/1987 | Tomalia et al. | 73/865.8 |
| 4,737,550 | 4/1988 | Tomalia | 525/418 |
| 4,857,599 | 8/1989 | Tomalia et al. | 525/259 |
| 4,871,779 | 10/1989 | Killat et al. | 521/28 |
| 5,085,698 | 2/1992 | Ma et al. | 106/20 |
| 5,098,475 | 3/1992 | Winnik et al. | 106/23 |
| 5,120,361 | 6/1992 | Winnik et al. | 106/22 |
| 5,125,968 | 6/1992 | Takimoto et al. | 106/20 |
| 5,169,436 | 12/1992 | Matrick | 106/20 D |
| 5,184,148 | 2/1993 | Suga et al. | 346/1.1 |
| 5,254,159 | 10/1993 | Gundlach et al. . | |
| 5,256,193 | 10/1993 | Winnik et al. . | |
| 5,266,106 | 11/1993 | Winnik et al. . | |
| 5,418,301 | 5/1995 | Hult et al. | 525/437 |
| 5,545,504 | 8/1996 | Keoshkerian et al. | 430/137 |
| 5,554,213 | 9/1996 | Radigan, Jr. et al. | 106/22 H |
| 5,560,929 * | 10/1996 | Hedstrand | 424/286 |
| 5,561,214 | 10/1996 | Yeske et al. | 528/363 |
| 5,596,027 | 1/1997 | Mead et al. | 523/161 |
| 5,714,632 | 2/1998 | Rao et al. | 562/450 |
| 5,731,095 | 3/1998 | Milco et al. | 428/482 |
| 5,777,129 | 7/1998 | Juneau et al. | 548/455 |
| 5,780,551 | 7/1998 | Engel et al. | 525/236 |
| 5,788,749 | 8/1998 | Breton et al. | 106/31.6 |
| 5,807,971 | 9/1998 | Gozzini et al. | 528/332 |
| 5,830,948 | 11/1998 | Frechet et al. | 525/410 |
| 5,837,045 | 11/1998 | Johnson et al. | 106/31.85 |
| 5,840,106 | 11/1998 | Krepski et al. | 106/20 R |
| 5,851,274 | 12/1998 | Lin | 106/31.43 |

FOREIGN PATENT DOCUMENTS

| | | |
|---|---|---|
| 0 722 994 A1 | 7/1996 | (EP) . |
| 0 851 013 A2 | 7/1998 | (EP) . |
| 0 882 772 A1 | 12/1998 | (EP) . |
| WO 94/17125 | 8/1994 | (WO) . |
| WO 96/14925 | 5/1996 | (WO) . |
| WO 97/43351 A1 | 11/1997 | (WO) . |
| WO 97/49774 A2 | 12/1997 | (WO) . |

OTHER PUBLICATIONS

Hawker, C. ,et al , J. Chem Soc, Perkin Trans 1 (1993), (12), 1287–97.*
Malmstroem, E. et al , Polym Bull, (Berlin) (1994), 32( 5–6), 679–85.*
Perstorp Polyols Bulletin, p. 1, Jun. 1994.
Malmstrom, E., Johansson, M., and Hult, A., "Hyperbranched Aliphatic Polyesters", *Macromolecules*, vol. 28, No. 5, (Feb. 27, 1995), p. 1698–1703.
Spinelli, H. J., "Polymeric Dispersants in Ink Jet Technology", *Advanced Materials*, vol. 10, No. 15, (1998), p.1215–1218.

* cited by examiner

*Primary Examiner*—Bernard Lipman
(74) *Attorney, Agent, or Firm*—Melanie Gover (57) ABSTRACT

Dispersants that adsorb to hydrophobic particle surfaces in aqueous media are described. The dispersants comprise dendritic polymers having at least one ionizable moiety and at least one peripheral hydrophobic long chain hydrocarbon moiety. Dispersions and inks wherein the dispersant operates as a solitary or co-dispersant are also described.

9 Claims, 1 Drawing Sheet

DENDRITIC POLYMER DISPERSANTS FOR HYDROPHOBIC PARTICLES IN WATER-BASED SYSTEMS

FIELD OF INVENTION

This invention describes dispersants for hydrophobic particles and particulate including pigments in water-based inks. Methods of making and using the dispersants are also disclosed.

BACKGROUND OF THE INVENTION

When hydrophobic particles are placed in water they tend to agglomerate. This tendency makes it difficult to obtain a dispersion of hydrophobic particles in a water-based system. To lessen this agglomeration tendency, a dispersant may be added to the mixture. If the dispersant has both hydrophobic and hydrophilic parts, the hydrophobic part will be attracted to the hydrophobic particle surface and the hydrophilic part will be solvated by the water.

In recent years, the use of thermal ink jet printers in numerous applications has increased dramatically. Such printers use liquid-based inks which are sprayed onto a receptor, typically a sheet of paper or film, to produce an image. By using basic ink colors (black, yellow, cyan, and magenta, or black, red, green and blue, as well as white pigments (such as $TiO_2$)), in various combinations and concentrations, virtually any color may be produced as part of the printed image. Additionally, ink jet technology is well-suited for high resolution graphic images, particularly those produced using electronic printing systems. Such systems typically employ computer technology to create, modify, and store images, text, graphics and the like.

Many of the inks that have been used in the past with ink jet and other printers are primarily comprised of dyes contained within organic-based carrier liquids. Although such inks may offer satisfactory performance in certain applications, the present trend is away from such systems, because such systems tend to produce images that lack the light stability and durability required for outdoor and similarly demanding applications. Additionally, the use of organic-based carrier liquids creates numerous environmental and material-handling complications. Rather, the printing industry has sought inks that are primarily water-based to thereby reduce or eliminate the problems associated with organic solvent-based systems.

Inks may comprise a suspension of pigment particles in a water-based carrier. However, the suspended pigments may tend to agglomerate. Because ink jet printers use very small jet nozzles (on the order of less than about 40 micrometers with droplet volumes on the order of picoliters) to provide high resolution images, pigment agglomerations may restrict or clog the printer heads. This effect is referred to herein as "plugging." Additionally, in the case of thermal ink jet systems, the ink is subjected to high temperatures (approximately 350° C.) as a result of the heating element in the nozzle. Typically inks tend to agglomerate at a faster rate at higher temperatures, and may also settle onto, and coat, the heating elements of the printer heads. This causes decreased thermal efficiency of the print head which results in the formation of smaller ink droplets and lower image quality. This effect is commonly referred to as "kogation." To overcome the problems described above, some pigment particles have been stabilized (from agglomeration) with dispersants. In one approach, the dispersants were formed from surfactants having a hydrophilic portion and a hydrophobic portion, which hydrophobic segment adsorbed onto pigment surfaces of varying hydrophobicity. In another approach, copolymers having hydrophilic and hydrophobic segments were used. Examples of these approaches are described in U.S. Pat. No. 4,597,794 and U.S. Pat. No. 5,085,698.

In the approaches described above, the hydrophobic segments of the surfactant or polymer can adsorb onto pigments by hydrophobic interaction between the dispersant molecule and the organic-based pigments whose surfaces tend to be hydrophobic. This hydrophobic interaction is usually not very strong. Because of this weak attraction, the dispersant molecules may desorb from the pigment surface, thereby allowing the pigment particles to agglomerate. During printing, this can result in plugging of the printer head jet nozzles. Although heat produced in a thermal inkjet system may strengthen the adsorption of the dispersant on the hydrophobic pigment surface, thus enhancing the stability of the ink, plugging and kogation remain a problem.

SUMMARY OF THE INVENTION

In view of the foregoing, a need exists for dispersants that strongly adsorb to hydrophobic particles in aqueous media and that inhibit particle agglomeration. A need also exists for water-based inks that offer increased stability. The present invention addresses such needs. One embodiment of the present invention provides a dispersant for dispersing hydrophobic particles in an aqueous system comprising a derivatized dendritic polymer having at least one ionizable moiety and at least one peripheral nonpolar nonpolymerized hydrocarbon hydrophobic moiety. A dendritic polymer having multiple ionizable moieties and multiple peripheral hydrocarbon hydrophobic moieties is preferred.

Another embodiment of the invention relates to stable water-based systems in which the inventive dispersant is incorporated into a water-based dispersion of hydrophobic particles. Collectively, the dispersants have both hydrophobic segments, which can adsorb to the hydrophobic surfaces of the particles, and hydrophilic ionizable segments, which exhibit mutual electronic repulsion thereby inhibiting particles agglomeration. Such dispersion systems comprise an aqueous suspension of a) hydrophobic particles, and b) a water-soluble dispersant comprising a substituted, derivatized dendritic polymer having at least one ionizable moiety and at least one peripheral long chain (i.e., more than 8 carbon atoms) hydrocarbon moiety that can adsorb to hydrophobic particles or particulate.

Other embodiments of the invention comprise a 3-generation or 5-generation hyperbranched polyester polyol having at least one ionizable group, the ionizable group being preferably anionic, and at least one peripheral hydrocarbon group. The hydrocarbon group is preferably a long chain aliphatic group.

The dendritic dispersants of the invention are particularly useful in stabilizing dispersions of hydrophobic materials, including pigments, in liquid dispersions and suspensions, especially aqueous dispersions and suspensions. The ionizable groups on the compact surface of a hyperbranched polymer provide a high charge density in a polar solution such as water. This high charge density greatly enhances interparticle repulsion, thereby helping to stabilize the dispersion.

A particular embodiment of the present invention relates to stable, water-based pigmented inks that meet the stringent requirements of ink jet and other printing applications. In these inks an inventive dispersant is incorporated into a water-based pigment dispersion to eliminate or reduce the likelihood that the hydrophobic pigment particles will agglomerate. Such inks comprise, generally, an aqueous suspension of a) pigment particles, and b) a dispersant comprising a dendritic polymer having at least one ionizable moiety and at least one peripheral hydrophobic hydrocarbon moiety that can adsorb to the pigment particles. When used to disperse hydrophobic pigment particles in an ink dispersion, the dispersant may enhance the colloidal stability of the ink, particularly under high temperature conditions. The dispersants may also provide a decrease in viscosity of the ink.

In another embodiment the dispersants of the invention may be used as binders to disperse hydrophobic particles of, e.g., silica, titania, or zirconia, in aqueous media to form suspensions. The suspensions may then be coated onto a substrate to form a film by conventional coating methods such as gravure, roll, curtain, die, and coextrusion.

The dispersants of the invention may be used alone or in conjunction with another dispersant as a primary or secondary dispersant. Inks containing the dispersants of the invention as a co-dispersant may provide prints with superior quality in terms of uniformity of color, absence of any banding, and adhesion to the printing substrate.

As used in this invention:

"adsorb" refers to the adherence of an atom, ion, or molecule on the surface of another substance;

"banding" refers to visible striations or lines of lower optical density that can occur when an ink is printed on a substrate;

"derivatize" or "derivatization" refers to producing or obtaining a material from a precursor material by chemical reaction(s) that adds or modifies a functional group on the precursor material;

"dispersant/particle composite" means a dispersant molecule and the particle or particulate to which the dispersant is adsorbed; typically the composite will comprise layers of dispersant molecules with the particle;

"aliphatic group," "aliphatic moiety," or "long chain aliphatic group or moiety" means a linear, branched, cyclic, unsubstituted or substituted, non-polar hydrocarbon having approximately 6 to 100, preferably 8 to 20, carbon atoms;

"aromatic group" or "aromatic moiety" means a nonpolar hydrocarbon, having approximately 6 to 100, preferably 8 to 20, carbon atoms, comprising at least one cyclic structure containing at least one π-conjugated ring structure;

"hydrocarbon group" or "hydrocarbon moiety" means an aliphatic or aromatic group or moiety;

"ionizable" means a neutral molecule comprising atoms capable of losing or gaining electrons, thereby acquiring a net electrical charge and becoming an ion, e.g., when placed in a polar medium such as water;

"monodisperse" refers to particles having the same or materially the same sizes or shapes, or polymer molecules having materially the same molecular weights;

"polydisperse" refers to particles having various sizes or shapes, or polymer molecules having a distribution of molecular weights;

"peripheral" means the terminal end of any branch or stem on a dendritic polymer;

"hydrophobic moiety" or "hydrophobic segment" means a nonpolar, water-insoluble hydrocarbon moiety that can associate or bond with the surface of a hydrophobic particle; a hydrophobic segment is not polymerized, but rather derived from a single aliphatic or aromatic precursor, e.g., n-octyl mercaptan;

"hydrophobic particle" means a particle that is nonpolar or has a nonpolar surface;

"solvate" refers to the phenomenon wherein a strong affinity of a solvent, e.g., water, for particles of dissolved or suspended substances leads to the particles acquiring a tightly held film of solvent on their surfaces; and "water soluble" refers to a material capable of being homogeneously distributed in water, such as a material that will form an aqueous solution or dispersion.

Further aspects of the invention will become apparent with reference to the following Figures, Detailed Description, and Claims.

DETAILED DESCRIPTION

Figure 1:
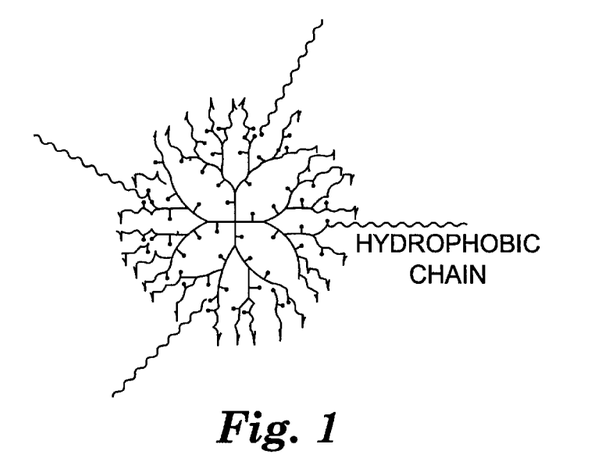
FIG. 1 is a line drawing that generally illustrates a dendritic polymer according to the invention having four peripheral long chain hydrocarbon moieties.
Figure 2:
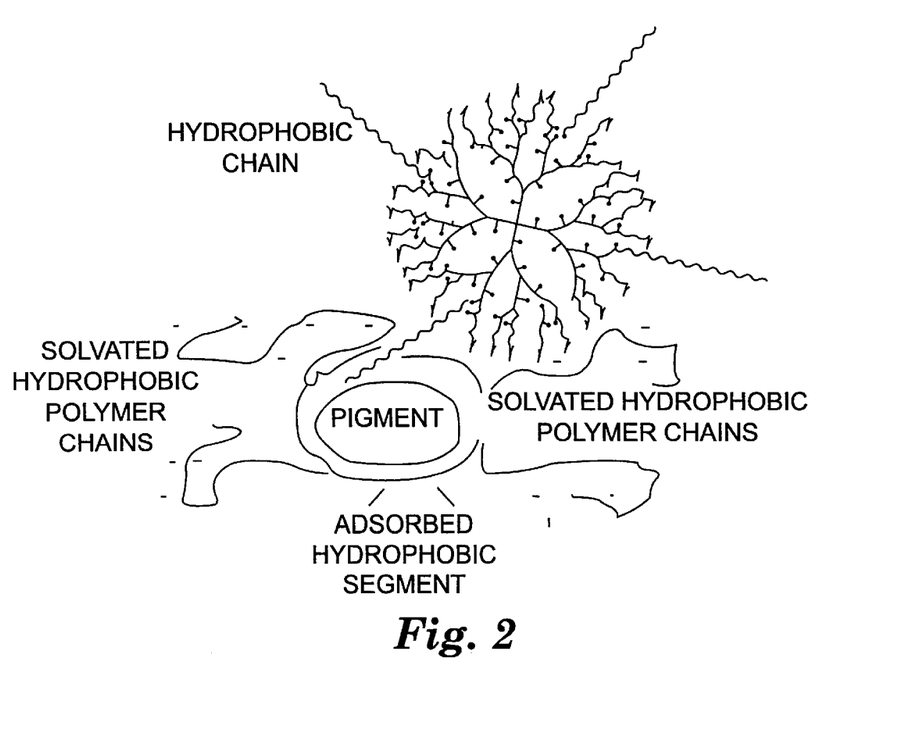
FIG. 2 is a line drawing that generally illustrates the use of a dispersant of this invention as a co-dispersant with a primary dispersant wherein both dispersants have hydrophobic segments that are adsorbed to a hydrophobic particle.

The dispersants of the invention generally comprise a dendritic structure, which structure may have varying degrees of branching. The structure comprises a hydrophilic or amphiphilic dendritic polymer having ionizable groups and nonpolymerized hydrocarbon hydrophobic moieties at peripheral sites. The hydrocarbon moieties can interact hydrophobically with hydrophobic particle surfaces, typically in aqueous dispersion systems. Although the dispersant contains water-insoluble segments, the dispersants are water-soluble, i.e., they will form aqueous dispersions.

Dendritic Polymer

Dendritic polymers that may be used in the practice of this invention include generally any of the known dendritic architectures including dendrimers, regular dendrons, dendrigrafts, and hyperbranched polymers. Dendritic polymers are polymers with densely branched structures having a large number of end reactive groups. A dendritic polymer includes several layers or generations of repeating units which all contain one or more branch points. Dendritic polymers, including dendrimers and hyperbranched polymers, can be prepared by condensation, addition, or ionic reactions of monomeric units having at least two different types of reactive groups.

Dendritic polymers are comprised of a plurality of dendrons that emanate from a common core, which core usually comprises a group of atoms. Dendritic polymers generally consist of peripheral surface groups, interior branch junctures having branching functionalities greater than or equal to two, and divalent connectors that covalently connect neighboring branching junctures.

Dendrimers can be prepared by convergent or divergent synthesis. Divergent synthesis of dendrimers involves a molecular growth process which occurs through a consecutive series of geometrically progressive step-wise additions of branches upon branches in a radially outward molecular direction to produce an ordered arrangement of layered branch generations, in which each macromolecule includes a core generation, one or more layers of internal generations, and an outer layer of surface generations, wherein each of the generations includes a single branch juncture. The generations can be the same or different in chemical structure and branching functionality. The surface branch generations may contain either chemically reactive or passive functional groups. Chemically reactive surface groups can be used for further extension of dendritic growth or for modification of dendritic molecular surfaces. The chemically passive groups may be used to physically modify dendritic surfaces, such as to adjust the ratio of hydrophobic to hydrophilic terminals. Convergent synthesis of dendrimers involves a growth process which begins from what will become the surface of the dendrimers and progresses radially in a molecular direction toward a focal point or core.

Dendrons and dendrimers may be ideal or non-ideal, i.e., imperfect or defective. Imperfections are normally a consequence of either incomplete chemical reactions or unavoidable competing side reactions.

Hyperbranched polymers can be prepared by one-pot polymerization reaction of a single type of monomer having a single reactive group of a first type (B) and a plurality (y) of reactive groups of a second type (A), i.e., a B-Ay type monomer, which is initiated by a core having a plurality (x) of the A type reactive groups, wherein A groups can react with B groups but not other A groups, and B groups cannot react with other B groups. The one-pot synthesis method for hyperbranched polymers is simpler and less expensive than the divergent and convergent synthesis methods for dendrimers. However, the one-pot synthesis method lacks reaction control, which leads to more polydisperse products with larger deviations from ideal dendron structure.

Hyperbranched polymers are dendritic polymers that contain high levels of non-ideal irregular branching arrays as compared with the more nearly perfect regular structure dendrimers. Specifically, hyperbranched polymers contain a relatively high number of irregular branching arrays in which not every repeat unit contains a branch juncture. Consequently, hyperbranched polymers may be viewed as intermediate between linear polymers and dendrimers. Yet they are dendritic because of their relatively high branch juncture content per individual macromolecule.

The preparation and characterization of dendrimers, dendrons, dendrigrafts, and hyperbranched polymers, is well known. Examples of dendrimers and dendrons, and methods of synthesizing the same are set forth in U.S. Pat. Nos. 4,507,466; 4,558,120; 4,568,737; 4,587,329; 4,631,337; 4,694,064; 4,713,975; 4,737,550; 4,871,779 and 4,857,599. Examples of hyperbranched polymers and methods of preparing the same are set forth, for example, in U.S. Pat. No. 5,418,301. Some dendritic polymers are also commercially available. For example, 3- and 5-generation hyperbranched polyester polyols may be obtained from Perstorp Polyols, Inc., Toledo, Ohio.

More generally, dendritic polymers or macromolecules are characterized by a relatively high degree of branching (DB), which is defined as the number average fraction of branching groups per molecule, i.e., the ratio of terminal groups plus branch groups to the total number of terminal groups, branch groups and linear groups. For dendrimers, the degree of branching is one. For linear polymers the degree of branching approaches zero. Hyperbranched polymers have a degree of branching that is between that of linear polymers and ideal dendrimers. The dendritic polymers used in this invention preferably have a degree of branching which is at least equal to 0.1, more preferably greater than 0.4, and most preferably greater than 0.5.

Dendritic polymers suitable for use with the invention also include macromolecules commonly referred to as cascade molecules, arborols, arborescent grafted molecules, and the like. Suitable dendritic polymers also include bridged dendritic polymers (i.e., dendritic macromolecules linked together either through surface functional groups or through a linking molecule connecting surface functional groups together) and dendritic polymer aggregates. The dendritic polymers of this invention can be used in combination to form mixtures that are generationally monodisperse or generationally polydisperse. Dendritic polymers that are monodisperse are substantially all of the same generation, and hence of uniform size and shape. Dendritic polymers that are polydisperse comprise a distribution of different generation polymers. Furthermore, the dendritic polymer molecules may be mixtures of different interior and exterior composition or functionality. Polymers with different generations and different degrees of derivatization may be mixed to obtain the optimum level of polarity needed for the dispersion being stabilized.

Generally, any of the known dendritic polymers having ionic, preferably anionic, peripheral groups, or having peripheral groups that can be reacted with another compound to provide ionic, preferably anionic, peripheral groups, are suitable for use in preparing the dendritic dispersants of this invention. Examples of suitable dendritic polymers include poly(ethers), poly(esters), poly(thioether), poly(arylalkylenes), poly(silanes), poly(amides), poly (urethanes), and any other condensation polymers.

The dendritic polymers of this invention may comprise any number of generations, preferably three to five generations.

Dispersant

The novel dispersants of the present invention comprise dendritic polymers modified by chemical reaction(s) to attach ionizable moieties and peripheral nonpolymerized nonpolar hydrocarbon hydrophobic moieties. The dispersants of the present invention may be the reaction products of dendritic polymers comprising reactive peripheral functional groups with both reactive compounds comprising hydrophobic hydrocarbon group(s) and reactive compounds comprising ionizable group(s). The hydrocarbon groups may be, e.g., aliphatic, cycloaliphatic, or aromatic. They may be unsubstituted or substituted, as long as any substituent is nonpolar.

The ionizable functional groups on a dendritic polymer are generally arranged in a branched configuration that provides a high charge density as compared to the charge density of a linear polymer having the same molecular weight. The ionic groups can be anionic or cationic, but should typically all have the same type of charge. The like charges cause the dispersant/particle composites to repel each other thereby inhibiting flocculation. Multiple solvatable, ionizable moieties are preferred to provide a high charge density. As discussed above, resistance to particle flocculation is desired to counteract the high thermal energy generated during jetting, which energy can cause frequent and energetic particle interactions, leading to flocculation. Reduction of particle flocculation is further desired because flocculation can decrease ink stability and shelf-life. The mutual repulsive forces of the dispersant molecules can help provide dispersion stability for an extended period of time, e.g., at least one year. The ionic groups are preferably anionic. Examples of suitable anionic functional groups include those derived from carboxylates, sulfonates, sulfates, phosphonates, and phosphinates, and any functional group that will ionize over a wide range of pH.

In addition to the dispersion stability provided by the high density of ionic charge on the dendritic dispersant, the hydrophobic hydrocarbon moieties can help impart stability to colloidal dispersions of particles by binding to hydrophobic particle surfaces through hydrophobic interaction. In general, the hydrophobic interaction achievable by the dispersant with hydrophobic particles depends on the number of hydrophobic groups available on the dispersant that can spread on the surface of each particle through hydrophobic interaction. The hydrocarbon moieties may comprise from about 6 to about 100 carbon atoms, preferably from 8 to 20 carbon atoms.

The derivatized dendritic dispersants can be designed based on the composition of the dispersion to be stabilized, most significantly the characteristics of the particles or particulate to be dispersed. Specific ionizable groups and hydrophobic hydrocarbon groups can be attached to the dendritic polymer to provide a dispersant molecule with an optimal balance of hydrophilic and hydrophobic properties in view of the given properties of the dispersion.

Optimizing the dispersant's effectiveness includes designing the dispersant to have an optimal number of ionizable moieties and hydrophobic moieties which hydrophobic moieties further may have an optimal length. The dispersant should be sufficiently hydrophilic and ionizable to maintain dispersibility and electrostatic repulsion, but should also have hydrophilic moieties sufficient to interact with hydrophobic particles. If the size and charge density of the dendritic structure allows a high degree of solvation by the carrier liquid of the dispersion, then more or longer hydrocarbon chains can be attached to the dendritic structure while maintaining solubility.

The degree of hydrophobicity or hydrophilicity of the dispersant molecule can be varied based on the relative weight % of hydrophilic and hydrophobic moieties comprising the dispersant. The balance may be influenced by choosing the number of generations comprising the dendritic polymer portion of the dispersant and the type, number, and location of functional groups on its periphery. These functional groups can then be reacted to provide the desired balance of ionizable moieties and hydrophobic moieties on the dendritic dispersant polymer. The number of generations will substantially determine the number of reactive functional groups on the dendritic polymer. The number, and composition, of generations of the polymer may be controlled by tailoring the reactions used to form the dendritic polymer. For example U.S. Pat. No. 5,418,301 discloses the synthesis of hyperbranched polyols.

The dispersants of the present invention can be made to be highly charged as evidenced by a high charge to mass ratio. For example, in the case of a 3-generation polyol having 32 unreacted peripheral hydroxyl groups, 28 to 29 of the hydroxyl groups can be reacted to provide anionic succinate functional groups. The remaining 3 to 4 hydroxyls can he reacted to provide hydrophobic long chain alkyl esters. For a 5-generation polyol having 128 unreacted hydroxyl groups, 115 to 116 of the hydroxyl groups can be reacted to provide anionic succinate groups. The remaining 12 to 13 hydroxyl groups can be reacted to provide hydrophobic long chain hydrocarbon alkyl esters. The multiple anionic succinate groups on the dispersant cause the dispersant/particle composites to become effectively highly negatively charged. The negative charge provides the desired electrostatic charge repulsion between the individual charged colloidal dispersant/particle composites of a dispersion system.

Functional groups on the reacting materials that are not directly involved in the reaction steps forming the dispersant compounds of the present invention may be reacted to meet desired physico-chemical property requirements of the final dispersants. This provides additional latitude in the formation of tailored dispersants.

Other factors considered in tailoring the structure of the dispersant include the number and size of all substituents added, which may affect the overall molecular weight, and, in turn, the viscosity of the dispersion.

When used as a co-dispersant, compatibility and interaction with the primary dispersant(s) are also important considerations in designing the dispersant polymer.

Ink Systems

The dispersants of the present invention have applicability as sole pigment dispersants or co-dispersants (primary or secondary) in ink jet inks and other printing inks. As secondary dispersant the dispersants can enhance the stabilizing effect of primary dispersants.

The inks of the present invention may be formed with a variety of pigments. In particular, the inventive inks may be provided with black, cyan, yellow, magenta, red, blue, green, and white pigments. By varying the individual color densities and overlying monochrome images, it is possible to provide virtually any color on an appropriate substrate. When combined with electronic graphic image systems, virtually any image that can be created or stored electronically can be reproduced using an ink jet printer. Of course, it should be understood that the present invention is not intended to be limited to inks of the colors discussed above. Rather, inks employing any pigment or combination of pigments compatible with electronic graphic image systems may be used.

For black inks, carbon black may be used as the black pigment. The selection of carbon blacks suitable for use with the present invention is based primarily upon considerations of surface oxidation and the degree of blackness (also called jetness) of the pigment. Pigments that are acidic or surface-treated provide suitable interaction sites for strong dispersant adsorption. Pigments with a high degree of blackness or jetness provide a high quality printed image.

For yellow inks, the use of nickel azo yellow pigment offers several advantages. First, such pigments provide inks, which are highly durable in outdoor environments. Second, such pigments contain nickel ions, which may be able to form complex bonds with the novel dispersants. Lastly, such pigments are believed to offer a high degree of thermal conductivity. As a result, if particle deposition onto a heater element does occur during the jetting process, the deposited film will not significantly reduce the heating efficiency of the ink, thereby allowing proper bubble formation.

For magenta inks, a primary consideration is lightfastness, since it is very desirable to produce graphic images that are adapted to outdoor applications. Quinacridone magenta pigment is known to have excellent lightfastness, and therefore, is one preferred magenta pigment.

For cyan inks, the considerations above, (i.e., lightfastness, durability, etc.), apply as well. As a variety of satisfactory properties may be found using copper phthalocyanine as a cyan pigment, inks comprising such pigments are one preferred embodiment.

Dispersant Selection: Because pigment particles are typically devoid of surface functional groups to provide bonding sites for a dispersant, a pigment dispersant preferably comprises a hydrophobic portion to interact with the hydrophobic solid pigment surface in an aqueous environment. The dispersants of this invention provide hydrophobic moieties to interact with, and adsorb to, the pigment particles. The hydrophilic segment of the dispersant can provide effective electrostatic and steric stabilization to the colloidal pigment dispersion.

Usually a pigment particle does not carry a single dispersant molecule, but rather multiple layers of dispersant molecules. This occurs because when a dispersant's hydrocarbon moiety adsorbs to the particle it facilitates the adsorption of a second dispersant molecule and this will continue until an equilibrium thickness of the adsorbed dispersant layer is reached.

Compatibility between the dispersant, pigment, and other components of the ink must also be considered. Dispersants used for different colored pigments that will be applied to the same receptor surface should preferably be thermodynamically miscible and should possess the same kind of ionic charge to prevent coagulation of the inks when deposited on the receptor surface.

If used as a co-dispersant, the dendritic dispersant must be compatible with the other dispersant. The dendritic dispersant may be derivatized to be compatible with the other dispersant. As with all dispersants that will be used together, the primary and secondary co-dispersants preferably have similar ionic charges so they do not neutralize each other, i.e., similar structural groupings such as hydrocarbon-hydrocarbon and anionanion. The primary and co-dispersants should preferably be thermodynamically miscible and soluble in the same solvent.

Addition of the dispersant as a co-dispersant to pigment dispersion inks was found to decrease viscosity of the inks. This is desirable for jetting through the printheads of wide format thermal drop-on-demand Inkjet Printers such as the Encad NOVAJET III, available from Encad, Inc., San Diego, Calif.

Inks: Inks preferably comprise water as a medium in which pigments may be dispersed. Such inks typically also include additives to provide various properties. For example, an additive such as a polyol may be employed to control the drying rate of the ink. Suitable polyols include, for example, polyalkylene glycols such as polyethylene glycol and polypropylene glycol; alkylene glycols whose alkylene group has 2–6 carbon atoms, such as ethylene glycol, propylene glycol, butylene glycol, triethylene glycol, 1,2,6-hexanetriol, hexylene glycol, and diethylene glycol; glycerol; and lower alkyl ethers of polyols such as ethylene glycol monomethyl or monoethyl ether, diethylene glycol methyl or ethyl ether, and triethylene glycol monomethyl or monoethyl ether. Diethylene glycol is the preferred polyol. A surfactant, useful for wetting and reducing the surface tension of the ink system, can be provided as well. In addition to the above, other ink additives commonly known in the art may also be used. These include, water-soluble organic cosolvents, humectants (in addition to the above-named polyols), biocides, fungicides, defoamers, corrosion inhibitors, viscosity modifiers, pH buffers, penetrants, sequestering agents, and the like.

Ink Processing: Aggregate pigment particle sizes in inks preferably range from 70 to 1000 nm, and more preferably from 70 to 250 nm. If used in an ink jet system, the particles are preferably less than 250 nm. Ink processing methods, e.g. grinding can be used to obtain small particles.

Current compounding technology for the processing of pigment dispersions employs numerous processing technologies. One such technology makes use of ultrasonic energy to achieve mixing and particle deflocculation. Another technology makes use of media mills, such as ball mills, sand mills or attritors. Media mills achieve acceptable pigment dispersions by subjecting the pigment mixture to high intensity microshearing and cascading, which breaks down agglomerations of the pigment particles. However, media mill processing systems often suffer from disadvantages including media wear product contamination. Additionally, if the flow rate in a media mill is raised beyond a certain level, the resulting grinding and dispersion becomes uneven, and much of the material leaves the system without being sufficiently processed.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks.

In the present invention, the pigmented ink formulation comprising the pigment, dispersant, auxiliary surfactant, water, DEG, and other additives were subjected to mixing under high shear conditions in a Hill mixer (Model #4000 Plus, AC drive), available from Hill Mixer, Inc., Paterson, N.J., which is a high speed impingement homogenizer comprising a spiral propeller with a "grapefruit style" head for greater suction through the head of the propeller. The shear mixing was done at moderate speeds around 2000 rpm. For some of the inks, after dilution to a 15 to 25% solids concentrate, the ink was subjected to fine-particle grinding by an "impinging jet" process generally described in PCT application WO 96/14925. The processed concentrate was typically diluted to 4 weight % solids with diethylene glycol to water mixtures having a DEG:water ratio of 20:80 to 12.5:87.5, preferably 12.5:87.5.

EXAMPLES

This invention may be illustrated by way of the following examples.

Test Methods
Thermal Stability

The processed inks were brought to a concentration of 4 weight % solids unless noted otherwise. The solids include the pigment, surfactant, and any other nonvolatile additives such as an auxiliary dispersant. The ink obtained after processing and filtration was poured into a glass vial (8.9 cm long×2.54 cm diameter), which was covered with a loosely fitting metal cap to help retain most of the liquid (typically 12.5 weight % diethylene glycol (DEG) in water) in the ink. The vial was left undisturbed in an oven at 60° C. to 65° C. for 1 week (unless otherwise noted in the examples). If no solids separation occurred at 60° C., the ink was considered to be thermally stable. If visual inspection revealed no coagulation nor even a small layer of separated solids floating on the ink, the vial was transferred to a 120° C. oven and left for two or more days to see if any solids separation occurred. If the ink showed no solids separation after two days it was onsidered to be highly stable.

Ouality of Prints on Encad NOVAJET III Printer

The inks were printed onto a vinyl receptor sheet available under the trademark SCOTCHCAL from 3M Company, St. Paul, Minn., using a thermal inkjet printer available under the trademark NOVAJET III from Encad, Inc, San Diego, Calif. In preparation for printing, the printheads were cleaned, the printer was checked for leaks, and the cartridges were filled with the ink to be tested. The quality of prints was judged visually, upon repeated trials, for uniformity of color over large format blocks (30 cm×90 cm), absence of banding, and adhesion to the substrate.

All materials mentioned in these examples are available from Aldrich Chemical Co., Milwaukee, Wis., unless otherwise noted.

Synthesis of Hyperbranched Dispersant Polymers

The following procedure was used to synthesize derivatized 3rd and 5th generation hyperbranched polymers, which were obtained from Perstorp Polyols, Inc., Toledo, Ohio. The commerically available Perstorp $3^{rd}$ and $5^{th}$ generation polyols have hydroxyl numbers of 500 and 470, respectively. *Perstorp Polyols Bulletin*, p.1, June 1994. Because the hydroxyl number for the $3^{rd}$ and $5^{th}$ generations are essentially the same, the amount of reactants used for the 5th generation is the same as for the $3^{rd}$ generation. The 3- and 5-generation dispersants in the following examples refer to dispersants made in the following manner. 200 g of a 3-Generation hyperbranched polyester polyol, nominal Mw of 3570; and —OH functionality of 32) available under the trademark BOLTORN H30 from Perstorp Polyols Inc., Toledo, Ohio and 1 weight % of p-toluenesulfonic acid were placed in a 3-neck reactor equipped with a stirrer and a nitrogen gas inlet. The reactor was heated to 140° C. until the polymer melted. See Malmstrom, E., Johansson, M., and. Hult, A., Macromolecules, 28, 1698–1703 (1995). To the continuously stirred molten polymer was added 25 weight % of stearic acid, which is 3.2 mole equivalents of the polymer or 10 mole % of the polymer's free hydroxyl groups. The mixture was left to react with continuous stirring and frequent addition of xylene to facilitate azeotropic water removal. A continuous nitrogen stream was blown through the reactor throughout the reaction time to facilitate the removal of the xylene/water azeotrope. After 2 hours of reaction, the nitrogen was turned off and the reactor was connected to a vacuum to remove any small molecule and volatiles. The resulting viscous brown liquid solidified as it was left to cool to room temperature. An approximately 100% yield was obtained.

150 g of the solidified stearyl derivative of the 3rd generation polyester polyol from the above reaction was mixed with an equal weight of diglyme in a 3-neck flask equipped with a stirrer, condenser, and a nitrogen gas inlet. The mixture was heated to 100° C. until the solid was dissolved to form a clear solution. To the clear solution was added 63 weight % of succinic anhydride (1 equivalent of the remaining free —OH groups) followed by 2 weight %, based on total solids weight, of 1,8-diazabicyclo [5.4.0] undec-7-ene(DBU)(1 to 2 moles). The mixture was heated under continuous stirring at 100° C. for 36 hrs. Then the clear liquid was coagulated in excess of hexane (25° C.). The resulting yellow paste was washed several times with warmn (45 to 50° C.) hexanes to ensure the removal of any unreacted anhydride. The resulting residue was air dried for 48 hours then further dried at 60° C. under vacuum for 24 hours. A similar procedure was adopted to the preparation of 5-generation HB polymer except the starting Perstrop polyol was BOLTORN H50, the 5th generation polyol. The resulting solids (the functionalized hyperbranched polymer preparation) were dissolved in water and neutralized by the addition of a sufficient amount of ammonia to react with any remaining hydroxyl groups. A 30 to 40 weight % solution of the solids was thus prepared. Sufficient ammonia was added to the solution to bring the pH to 9–10.

Preparation of Primary Co-Dispersants

A suitable primary dispersant may be a dispersant having an $AB_n$ structure wherein A is a hydrophilic (co)polymeric segment containing ionizable moieties and is terminated with a multifinctional chain transfer agent, B is a nonpolar nonpolymerized hydrocarbon hydrophobic moiety, n is greater than one, and the B moieties form a forked segment at the chain transfer agent-terminated end of the A segment, as disclosed in copending application U.S. Ser. No. 09/216, 161 (Attorney Docket No. 54278USA3A), which is incorporated by reference.

The hydrophilic A segment may comprise ionizable monomers such as acrylic acid (AA), 2-acrylamido-2-methyl-1-propanesulfonic acid (AMPS), itaconic acid, propenoic acid, and anhydrides such as maleic anhydride, and itaconic anhydride. Copolymers may optionally comprise non-ionic monomers such as isobomyl acrylate (IBA), isooctyl acrylate, and alkyl acrylates such as ethyl-, butyl-, and isobutyl-acrylates, and styrene. To ensure that the dispersant is water soluble the content of nonionic monomers in the A segment preferably does not exceed 40 weight %. The molecular weight of the dispersant is typically below 100,000, preferably below 50,000 and most preferably in the range of 15,000 to 35,000.

Suitable chain transfer agents include mercaptodicarboxylic acid, mercaptopolyol, halopolyol, or any other moiety that can terminate the hydrophilic segment and provide reaction sites for the hydrophobic moieties of the hydrophobic segment.

The hydrophobic moieties preferably comprise aliphatic or aromatic hydrocarbon chains, preferably aliphatic, having 6 to 100, preferably 8 to 22, carbon atoms.

Another suitable primary dispersant may be a dispersant comprising a nonpolar nonpolymerized hydrocarbon hydrophobic segment joined to at least one terminal polymeric hydrophilic segment comprised of a polyelectrolyte, as disclosed in copending application U.S. Ser. No. 09/216,657 (Attorney Docket No. 54277USA5A), which is incorporated by reference.

The hydrophilic segment may be comprised of water-soluble monomeric units such as, for example, acrylic acid (AA), 2-acrylamido-2-methyl-1-propanesulfonic acid (AMPS), salts of sulfopropyl acrylate, maleic anhydride, itaconic anhydride, β-carboxy ethylacrylate, vinylazlactone-glycolic acid aduct, sodium styrene sulfonate, or combinations of these materials.

The hydrophilic segments are preferably reacted with chain transfer agents that comprise a hydrophobic hydrocarbon group. Suitable mono- and multi-functional hydrophobic chain transfer agents include alkyl-substituted phenyl mercaptans, alkyl mercaptonaphthalenes, alkyl mercaptothiophenes, alkyl halides or combinations of these materials. Specific examples of these materials include n-octanethiol, isooctyl mercaptoproprionate, n-tetradecylmercaptan, trimethylopropane, tri(3-mercaptoproprionate), and pentaerythritol tetra(3- mercaptoproprionate). The hydrocarbon groups preferably comprise aliphatic or aromatic hydrocarbon chains, preferably aliphatic, having 6 to 100, preferably 8 to 22, carbon atoms comprises between 8 and 22 total carbon atoms.

Formulations of Ink

The ink formulations illustrate the use of derivatized dendritic polymers as pigment dispersants. The inks incorporate the 3-Generation and 5-Generation Perstrop polyols derivatized with a stearyl hydrophobe and modified by reaction with succinic anhydride to provide a high charge density of —COO$^-$ at the branch ends.

To evaluate the efficacy of the dispersants, a generalized procedure was adopted to prepare pigmented ink. A pigment was typically dispersed in an aqueous solution of diethylene glycol (DEG) in the presence of an auxiliary surfactant and the dispersant. Usually, the pigment to dispersant weight ratio was from 3:2 to 2:1. The auxiliary surfactant was added to adjust the surface tension of the ink, assist in its jettability through the printer nozzle, and wet the receptor surface. The surfactant may also provide added stability to the dispersion system. Hyperdispersants, designed to wet the pigment surface, were optionally included. Diethylene glycol served as a humectant.

Grinding of the Ink

The ingredients corresponding to each ink formulation, withholding approximately 10% of the quantity of water to be used, were mixed at ambient temperature and pressure under high shear conditions in a Hill mixer (Model #4000 Plus, AC drive), available from Hill Mixer, Inc., Paterson, N.J., which is a high speed impingement homogenizer-mixer comprising a spiral propeller with a "grapefruit style" head for greater suction through the head from the propeller. The mixer has a motor rated at 1 horsepower (HP) with a capacity of 10,000 revolutions per minute (rpm). Propeller speeds of up to 2,000 rpm (in both forward and reverse modes) were used for grinding. The water that was withheld was used to rinse the mixer to collect any adhering ink concentrate after the grinding operation. The resulting concentrate was preferably 15 to 20 weight % solids to avoid forming high viscosity pastes, which are difficult to grind.

The Hyperbranched (HB) 3-Generation or 5-generation polyols modified by derivation with hydrophobic stearyl groups and ionic succinic anhydride were then added to the ink concentrate, after the primary ink concentrate was prepared. This solution was then subjected to further grinding under high shear conditions with a Hill mixer.

The inks from Examples 2–4 were prepared by using the above-mentioned grinding process only. The inks were not filtered. The inks of Examples 1 and 5–7 were obtained by processing the inks in two steps: first the above-described grinding process, then subjecting the concentrates to a jet impinging process involving the ink jetting at high speeds through nozzles of a few microns diameter. The jet impinging process shears the agglomerates of pigment crystallites to smaller aggregates, which take up additional quantities of the dispersant as a result of increased surface area. The resulting concentrate was further diluted typically to 4 weight % solids in a 12.5 to 15% DEG solution of water.

Example 1 (Magenta Ink)

Primary Dispersant

Seventy-five grams (g) of 2-acrylamido-2-methyl-1-propanesulfonic acid (AMPS), and 75 g of potassium sulfopropyl acrylate were dissolved in a mixture of 400 g of dimethyl formamide (DMF) and 100 g of water. After flushing the monomer mixture with nitrogen for 20 minutes at a rate of 50 bubbles/min, 1.5 g of isooctyl mercaptopropionate, available from Evans Chemetics, Hampshire Chemical Corp., Lexington, Mass., was dissolved in the monomer mixture along with 7 g of an azo thermal initiator available as VAZO 52 from DuPont Chemical Co., Wilmington, Del. The container holding the monomer solution was mechanically shaken for 36 hours at 55° C. The resulting polymer solution was added to 2 liters of acetone to precipitate the polymer. The polymer was then washed with two increments of approximately 300 milliliter (mL) of acetone. After the solvent (DMF) was removed, the remaining solids were dissolved in water to obtain a 30–35 weight % solution of the dispersant isooctyl-S-poly(2-acrylamido-2-methyl-1-propanesulfonic acid-co-potassium sulfopropyl acrylate).

Ink

Two hundred grams of a quinacridone magenta pigment available under the trademark Sunfast Magenta Presscake (428–5024; 40.5% solids) from Sun Chemical, Corp., Cincinnati, Ohio was suspended in a mixture of 107 g of DEG and 410 g of water. One hundred twelve grams of a 22.8 weight % solution of primary dispersant (25.53 g solids) was added, followed by 12 g of an alkaryl polyether alcohol surfactant available under the trademark TRITON X-100 from Union Carbide and Plastics CO., Gary, Ind. The resulting mixture was subjected to grinding in a Hill mixer for 3 hours at approximately 2000 rpm. Then 61.6 g of a 36 weight % aqueous solution of the previously described 3-Generation hyperbranched dispersant was added. One hundred grams of water were added and grinding was continued for another hour.

The resulting ink concentrate was subjected to fine particle grinding in an impinging jet process generally as described in PCT Publication WO 96/14925 for 30 to 45 minutes. The resulting concentrate was filtered through a 0.5 to 1.0 $\mu$m filter such as a Whatman Polycap 36 HD cartridge type filter, available from Arbor Technology, Ann Arbor, Mich. and further diluted with a 12.5:87.5 DEG:water mixture to an approximately 4 weight % solids ink.

The particle size, as measured by an N+ submicron particle analyzer, available from Coulter Corp., Hialeah, Fla., ranged between 100–150 nm.

The ink was stable at 60° C. and 120° C.

The ink was jetted through the printheads of an Encad NOVAJET III wide format printer onto a SCOTCHCAL receptor sheet to yield 30 cm×90 cm magenta prints exhibiting uniform color, no banding, and adhesion to the substrate.

Example 2 (Magenta Ink)

Primary Dispersant 12.5 g of AMPS and 12.5 g of potassium sulfopropyl acrylate was dissolved in 100 g of 1:1 weight ratio solvent mixture of DMF and acetonitrile and flushed with nitrogen for 20 minutes. A mixture of 0.23 g of trifunctional mercaptan and 0.024 g of monofunctional mercaptan was added, followed by 1.24 g of VAZO 52 initiator. The homogeneous solution was shaken in a water bath for 36 hours at 55° C. to obtain the polymer. The polymer solution was added to 500 mL of acetone to precipitate the polymer. The precipitate was then washed with two increments of approximately 100 mL of acetone. The solvents were removed and the polymer was dissolved in water to obtain an approximately 30 weight % solution of dispersant comprising a mixture of trimethylolpropane tri-(3-mercaptopropionate)-terminated poly(AMPS-co-potassium sulfopropyl acrylate)/n-octyl mercaptan-terminated poly(AMPS-co-potassium sulfopropyl acrylate).

It is postulated that the dispersant comprised a mixture of at least two structures: (1) three oligomeric copolymers (poly(AMPS-co-potassium sulfopropyl acrylate)) joined at the three -SH units of trimethylolpropane tri-(3-mercaptopropionate) and (2) n-octyl-mercaptan-terminated oligomeric copolymers. The monofunctional n-octyl-mercaptan-terminated chain is believed to provide the hydrophobic segment with which a hydrophobic particle can interact. The hydrophilic multifunctional copolymers are believed to provide added electrostatic and steric stability to the dispersion. The monfunctional chain is also believed to dilute the concentration of multifunctional copolymers thereby decreasing molecular entanglement or crosslinking of the multifunctional copolymers, which entanglement or crosslinking can cause insoluble network (gel) formation.

Ink

Twenty grams of a quinacridone magenta pigment available under the trademark SUNFAST Magenta 428–5024 (40.5% solids presscake) from Sun Chemicals was suspended in a mixture of 30 g of DEG and 160 g of water. About 30 g of a 25% solution of the primary dispersant was added. The resulting mixture was ground for 2 hours in a Hill mixer at approximately 2000 rpm. To this mixture was added 19.5 g of a 38% aqueous solution of 5-Generation hyperbranched dispersant (equivalent to 7.4 g of solids). Grinding was continued for another hour, then the mixture was diluted with a 12.5% DEG aqueous solution to an approximately 4% weight solids ink.

The resulting ink was found to be a stable non-coagulating dispersion after being thermally tested at 60° C. for one week.

Example 3 (Magenta Ink)

Primary Dispersant 12.5 g of AMPS and 12.5 g of potassium sulfopropyl acrylate was dissolved in a solvent mixture of 75 g of DMF and 25 g of water. The resulting solution was flushed with nitrogen for 20 minutes at a rate of 50 bubbles/min. Then 0.1858 g of pentaerythritol tetra-(3-mercaptopropionate) and 0.2782 g n-octyl mercaptan were added, followed by 1.24 g of VAZO 52 initiator. After all the solids were dissolved and the solution appeared homogeneous, the solution was shaken in a water bath at 55° C. for 2 hours, to obtain the polymer. The polymer solution was added to 500 mL of acetone to precipitate the polymer. The precipitate was then washed with two increments of approximately 100 mL of acetone. The solvents were removed by decantation and the polymer was dissolved in water to obtain an approximately 30 weight % solution of dispersant having a mixture comprising pentaerythritol tetra (3-mercaptopropionate)-terminated poly(AMPS-co-potassium sulfopropyl acrylate)/n-octyl mercaptan-terminated poly(AMPS-co-potassium sulfopropyl acrylate).

It is postulated that the dispersant comprised a mixture of two structures: (1) four hydrophilic oligomeric copolymer moieties (poly(AMPS-co-potassium sulfopropyl acrylate)) joined to the four sulfur atoms on the pentaerythritol chain by chain transfer process and (2) n-octylmercaptan-terminated chain. The monofinctional n-octyl-mercaptan-terminated chain is believed to provide the hydrophobic segment with which a hydrophobic particle can interact. The hydrophilic multifunctional copolymers are believed to provide added electrostatic and steric stability to the dispersion. The monfunctional chain is also believed to dilute the concentration of multifunctional copolymers thereby decreasing molecular entanglement or crosslinking of the multifunctional copolymers, which entanglement or crosslinking can cause insoluble network (gel) formation.

Ink

The ink concentrate was prepared in the same manner as Example 2, except the ink concentrate was made with: 20 g of the magenta pigment; approximately 200 g of a 12.5 weight % aqueous solution of DEG; about 30 g of a 25% solution of the primary dispersant (7.5 g solids); 2 g of TRITON X-100; 6.6 g of a 38% solution of 3-Generation dendritic dispersant (2.5 g of solids). A stable non-coagulating dispersion was obtained.

Example 4 (Cyan Ink)

Primary Dispersant

Twenty grams of 2-acrylamido-2-methyl-1-propanesulfonic acid (AMPS), and 10 g of NNDMA were dissolved in a mixture of 50 g of dimethyl formamide (DMF) and 50 g of acetonitrile. After flushing the monomer mixture with nitrogen for 20 minutes at a rate of 50 bubbles/min, 0.69 g of n-octadecylmercaptan, available from Evans Chemetics, Hampshire, Chemical Co., Lexington, Mass., was dissolved in the monomer mixture along with 1.24 g of an azo thermal initiator available as VAZO 52 from DuPont Chemical Co., Wilmington, Del. The container holding the monomer solution was mechanically shaken for 36 hours at 55° C. The resulting polymer solution was added to 2 liters of acetone to precipitate the polymer. The polymer was then washed with two increments of approximately 300 mL of acetone. After the solvent was removed by decantation, the remaining solids were dissolved in water to obtain a 30–35 weight % solution of the dispersant n-octadecyl-S-poly(AMPS-co-NNDMA).

Ink

Twenty-seven grams of a copper phthalocyanine cyan pigment available under the trade name Cyan Presscake 499–1281 (36% solids) from Sun Chemical and 18 g of a 25% solution of the primary dispersant (4.5 g of solids) were suspended in a mixture of 27 g of DEG and 160 g of water. Two grams of an acetylenic diol-anionic surfactant blend (serving as a grinding aid/surfactant) available under the trade name SURFYNOL CT-136 from Air Products, Allentown, Pa., were added. This mixture was subjected to high shear grinding in a Hill mixer for 2 hours at approximately 2000 rpm. Then 6.6 g of a 38% solution of 3-Generation dendritic dispersant solution (2.5 g of solids) were added. Grinding was continued for another hour to obtain an approximately 15 weight % solids ink concentrate.

The ink was thermally stable at 60° C.

Example 5 (Yellow Ink)

Primary Dispersant

A mixture of 250 g of isobomyl acrylate (IBA) and 250 g of acrylic acid (AA) was dissolved in 450 g of methyl ethyl ketone in a 32 oz glass jar. Added to this mixture was 50 g of dimethyl-formamide followed by 7.5 g of 3-mercapto-1,2-propanediol (MPD) and 0.12% by weight (based on total monomer concentration) of the photoinitiator diethoxyphenylacetophenone available under the trade name KB-1 from Sartomer Co., Exton, Pa. The resulting homogeneous reaction solution was flushed for 20 minutes with nitrogen at a rate of approximately 50 to 100 bubbles per minute. Then, while nitrogen flushing continued, the reaction solution was exposed to a 300 to 365 nm UV black light source to cause polymerization. Monomer-to-polymer conversion was monitored by gravimetric analysis (drying a sample of known weight in a vacuum at 160° C., thereby causing any monomers in the sample to evaporate, then weighing the dried sample to determine the polymer content). After reaching almost 100% conversion, 40.9 g of octadecyl isocyanate (twice the mole ratio of MPD) was added to the polymeric solution, followed by 1 to 2 drops (from and eyedropper) of dibutyltin dilaurate. The polymeric solution was shaken overnight at ambient temperature. Completion of the reaction between the IBA, AA, and octadecyl isocyanate was monitored by infrared spectroscopy. The reacted polymer was then isolated by neutralization of the carboxyl groups in the polymer with ammonia, followed by precipitation in acetone(2L). The acetone was removed and the polymer was suspended in water to obtain a 25 solids weight % solution.

Ink

One hundred grams of a nickel azo complex yellow pigment available under the trademark FANCHON Fast Y-5688 from Bayer Corp., Rock Hill, S.C. was suspended in a mixture of 100 g of DEG and 500 g of water. Twenty-two grams of a nonionic aromatic ethoxylated polymeric hyperdispersant available under the trademark SOLSPERSE 27000 from Zeneca Pigments and Additives, Blackley, Manchester, England, and 10 g of a non-ionic ethoxylated fatty ester surfactant(dispersing agent) available under the trademark ALKAMULS EL-620 from Rhodia, Inc., Cranbury, N.J. were added. The resulting mixture was ground in a Hill mixer for 2 hours at approximately 2000 rpm. Then 211.4 g of a 31.5 weight % solids aqueous solution of the primary dispersant was added and grinding was continued for another 2 hours. Then 155 additional grams of water were used to collect the ink (and dilute it) by rinsing the grinding equipment and collecting the rinse water. A 20 weight % solids ink concentrate was produced.

The entire quantity of the 20 weight % ink concentrate from above was mixed with 58.4 g of a 38 weight % solids aqueous solution of the 5-Generation functionalized hyperbranched dispersant polymer described hereinabove. The resulting mixture was ground in a Hill mixer for an hour at approximately 2000 rpm then diluted to a 12–15 weight % solids ink concentrate and subjected an impinging jet process, filtered, and diluted as described in Example 1, to an approximately 4 weight % solids ink.

The particle size of the pigment particles in the ink, as measured by a Coulter N+ submicron particle analyzer ranged between 100 and 150 nm.

The ink was thermally stable at 60° C. and 120° C.

The ink was jetted through the printheads of Encad Novajet III wide format printer onto a SCOTCHCAL receptor sheet to yield 30 cm×90 cm prints of yellow color exhibiting uniform color, no banding and adhesion to the substrate.

Example 6 (Cyan Ink)

Primary Dispersant

A mixture of 300 g of IBA and 200 g of AA was dissolved in 450 g of methyl ethyl ketone in a 32 oz glass jar. Added to this mixture was 50 g of dimethyl-formamide followed by 10 g of 3-mercapto-1,2-propanediol (MPD) and 0.12% by weight (based on total monomer concentration) of the photoinitiator diethoxyphenyl acetophenone (KB-1). The resulting homogeneous reaction solution was flushed for 20 minutes with nitrogen at a rate of approximately 50 to 100 bubbles per minute. Then, while nitrogen flushing continued, the reaction solution was exposed to a 300 nm UV black light source to cause polymerization. Monomer-to-polymer conversion was monitored by gravimetric analysis (drying a sample of known weight in a vacuum at 160° C., thereby causing any monomers in the sample to evaporate, then weighing the dried sample to determine the polymer content). After reaching almost 100% conversion, 40.9 g of octadecyl isocyanate (twice the mole ratio of MPD) was added to the polymeric solution, followed by 1 to 2 drops (from an eyedropper) of dibutyltin dilaurate. The polymeric solution was shaken overnight at ambient temperature. Completion of the reaction between the IBA, AA, and octadecyl isocyanate was monitored by infrared spectroscopy. The reacted polymer was then isolated by neutralization of the carboxyl groups with ammonia, followed by precipitation in acetone(2L). The acetone was removed and the polymer suspended in water to obtain a 25 solids weight % solution.

Ink

Two hundred grams of a copper phthalocyanine cyan pigment having its surface modified with an adsorbed polyethylene glycol material (54% solids presscake), available under the trade designation 751–91A from Sun Chemical was suspended in a mixture of 160 g of DEG and 1 liter of water. Twenty-one grams of a copper phthalocyanine derivative hyperdispersant available under the trademark SOLSPERSE 12000 from Zeneca Pigments and Additives and 21 g of grinding aid/surfactant SURFYNOL CT-136 were added. The resulting mixture was subjected to grinding in a Hill mixer for 2 hours at approximately 2000 rpm. Then approximately 67.2 g of a 35.5 weight % solids aqueous solution of the primary dispersant were added to the mixture and grinding was continued for 2 more hours.

To the above ink concentrate was added approximately 50 g of a 22.5 weight % solids aqueous solution of 3-Generation hyperbranched dispersant (providing 11 g of solids). The mixture was ground in a Hill mixer for another hour. The resulting mixture was subjected an impinging jet process, filtered, and diluted as described in Example 1, to an approximately 4 weight % solids ink.

The particle size of the pigment particles, as measured by a Coulter N+ submicron particle analyzer, ranged between 100 and 150 nm.

The ink was thermally stable at 60° C. and 120° C.

The ink was jetted through the printheads of Encad Novajet III wide format printer onto a SCOTCHCAL receptor sheet to yield 30 cm×90 cm prints of cyan color exhibiting uniform color, no banding and adhesion to the substrate.

Example 7 (Magenta Ink)

Primary Dispersant

A mixture of 250 g of isobornyl acrylate (IBA) and 250 g of acrylic acid (AA) was dissolved in 450 g of methyl ethyl ketone in a 32 oz glass jar. Added to this mixture was 50 g of dimethyl-formamide followed by 10 g of 3-mercapto-1,2-propanediol (MPD) and 0.12% by weight (based on total monomer concentration) of the photoinitiator diethoxyphenylacetophenone available under the trademark KB-1 from Sartomer Co., Exton, Pa. The resulting homogeneous reaction solution was flushed for 20 minutes with nitrogen at a rate of approximately 50 to 100 bubbles per minute. Then, while nitrogen flushing continued, the reaction solution was exposed to a 300–365 nm UV black light source to cause polymerization. Monomer-to-polymer conversion was monitored by gravimetric analysis (drying a sample of known weight in a vacuum at 160° C., thereby causing any monomers in the sample to evaporate, then weighing the dried sample to determine the polymer content). After reaching almost 100% conversion, 40.9 g of octadecyl isocyanate (twice the mole ratio of MPD) was added to the polymeric solution, followed by 1 to 2 drops (from an eyedropper) of dibutyltin dilaurate. The polymeric solution was shaken overnight at ambient temperature. Completion of the reaction between the IBA, AA, and octadecyl isocyanate was monitored by infrared spectroscopy. The reacted polymer was then isolated by neutralization of the carboxyl groups in the polymer with ammonia, followed by precipitation in acetone(2L). The acetone was removed and the polymer was suspended in water to obtain a 25 solids weight % solution.

Ink 405 g of a qinacridone magenta pigment available under the trademark Magenta 122 Presscake (428–5024; 29.6% solids presscake) from Sun Chemical was suspended in a mixture of 120 g of DEG and 450 g of water containing 15 g of dissolved surfactant TRITON X-100. Then 202 g of a 24.7 weight % solution (49 g of solids) of the primary dispersant were added. The mixture was subjected to grinding in a Hill mixer for 2 hours. Then 90 g of a 30 weight % solids aqueous solution (approx. 32 g of solids) of 3-Generation hyperbranched dispersant was added to the mixture and the grinding was continued for another 2 hours at approximately 2000 rpm. The resulting ink concentrate was subjected to fine particle grinding in an impinging jet process, filtered and diluted as described in Example 1 to produce an approximately 4 weight % solids ink.

The particle size of the pigment particles, as measured by a Coulter N+ submicron particle analyzer, ranged between 100 and 150 nm. The ink was thermally stable at 60° C. and after 2 days at 120° C.

The ink was jetted through the printheads of Encad Novajet III wide format printer to onto a SCOTCHCAL receptor sheet yield 30 cm×90 cm prints of magenta color exhibiting uniform color, no banding and adhesion to the substrate.

Hydrophilic Secondary Codispersant (water-soluble polymer with no nonpolar units)

In the following two examples, the dendritic dispersant is the primary dispersant. The secondary codispersant is completely water-soluble. It has no hydrophobic moiety that can adsorb to a hydrophobic particle. Examples 8 and 9 provide for the case in which the nonpolar moiety is entirely provided by the hydrocarbon group on the dendritic polymer, and not by any codispersant.

Example 8

Two hundred thirty-seven grams of a copper phthalocyanine cyan pigment having its surface modified with an adsorbed polyethylene glycol material (54.6% solids presscake), available under the trade designation 751–91A from Sun Chemical was suspended in a mixture of 188 g of DEG and 900 g of water. To this was added 26.8 g of a 30% ammonium hydroxide solution followed by 134 g of a 33% solution (42.2 g of solids) of an acrylic acid/itaconic acid 100% water-soluble copolymer dispersant available under the trademark SPERSE 8845 from Chemdal Corp., Palatine, Ill. Also added was 1 to 2 g of auxiliary surfactant TRITON-X 100 and 26.8 g of grinding aid/surfactant SURFYNOL CT-136 were added. The resulting mixture was subjected to grinding in a Hill mixer for 2 hours at approximately 2000 rpm. Then approximately 67 g of a 38 weight % solids aqueous solution (providing 25.5 g of solids) of the $5^{th}$ generation dendritic dispersant described in this example set were added to the mixture and grinding was continued for another hour.

The resulting mixture was subjected an impinging jet process, filtered, and diluted as described in Example 1, to yield an approximately 4 weight % solids ink.

The particle size of the pigment particles, as measured by a Coulter N+ submicron particle analyzer, did not exceed 100 nm.

The ink was thermally stable at 60° C. and 120° C.

The ink was jetted through the printheads of Encad Novajet III wide format printer onto a SCOTCHCAL receptor sheet to yield 30 cm×90 cm prints of only cyan color, as well as combination prints of cyan, magenta, yellow, and black, exhibiting uniform color, no banding and adhesion to the substrate.

Example 9

Example 9 was prepared and tested in a manner similar to Example 8 except 134 g of a 33 weight % solution of an acrylic acid/styrene sulfonic acid 100% water-soluble copolymer dispersant available under the trademark SPERSE 8145 from Chemdal Corp., Palatine, Ill., was used instead of SPERSE 8845.

The particle size of the pigment particles, as measured by a Coulter N+ submicron particle analyzer, did not exceed 100 nm.

The ink was thermally stable at 60° C. and 120° C.

The ink was jetted through the printheads of Encad Novajet III wide format printer onto a SCOTCHCAL receptor sheet to yield 30 cm×90 cm prints of only cyan color, as well as combination prints of cyan, magenta, yellow, and black, exhibiting uniform color, no banding and adhesion to the substrate.

Other embodiments of the invention are within the scope of the following claims.

What is claimed is:

1. A dispersant for dispersing hydrophobic particles in an aqueous system comprising a water-soluble derivatized dendritic polymer having a random distribution of peripheral ionizable moieties and peripheral nonpolymeric hydrocarbon hydrophobic moieties.

2. The dispersant of claim 1 wherein each hydrocarbon moiety comprises between 8 and 20 carbon atoms.

3. The dispersant of claim 1 wherein the hydrocarbon moiety is aliphatic.

4. The dispersant of claim 1 wherein the hydrocarbon moiety comprises a stearyl group.

5. The dispersant of claim 1 wherein the ionizable moiety is anionic.

6. The dispersant of claim 1 wherein the dendritic polymer comprises a 3-generation hyperbranched dendritic polymer.

7. The dispersant of claim 1 wherein the dendritic polymer comprises a 5-generation hyperbranched dendritic polymer.

8. The dispersant of claim 1 wherein the dendritic polymer comprises a 3- or 5-Generation hyperbranched polyester polyol and the hydrocarbon moiety comprises a strearyl group.

9. The dispersant of claim 1 wherein the water-soluble dendritic polymer is randomly derivatized.

* * * * *

UNITED STATES PATENT AND TRADEMARK OFFICE
CERTIFICATE OF CORRECTION

PATENT NO. : 6,258,896 B1  
DATED : July 10, 2001  
INVENTOR(S) : Ahmed S. Abuelyaman, Prabhakara S. Rao, and Babu N. Gaddam It is certified that error appears in the above-identified patent and that said Letters Patent is hereby corrected as shown below:

Column 7,
Line 3, "sulfates," should read -- sulfinates, --

Column 11,
Line 64, "warmn" should read -- warm --

Column 12,
Line 27, "isobomyl" should read -- isobornyl --

Column 16,
Line 2, "monofinctional" should read -- monofunctional --
Line 48, "trade name" should read -- trademark --
Line 54, "trade name" should read -- trademark --

Column 17,
Line 5, "trade name" should read -- trademark --

Column 18,
Line 60, "isobomyl" should read -- isobornyl --

Column 19,
Line 42, "printer to onto a" should read -- printer onto a --

Signed and Sealed this

Twenty-ninth Day of January, 2002

Attest:

*Attesting Officer*

JAMES E. ROGAN
*Director of the United States Patent and Trademark Office*